(12) United States Patent
Katsube et al.

(10) Patent No.: US 8,331,895 B2
(45) Date of Patent: Dec. 11, 2012

(54) RECEIVING CIRCUIT

(75) Inventors: Yusaku Katsube, Yokohama (JP); Akio Yamamoto, Yokohama (JP)

(73) Assignee: Renesas Electronics Corporation, Kanagawa (JP)

( * ) Notice: Subject to any disclaimer, the term of this patent is extended or adjusted under 35 U.S.C. 154(b) by 320 days.

(21) Appl. No.: 12/846,618

(22) Filed: Jul. 29, 2010

(65) Prior Publication Data

US 2010/0311381 A1 Dec. 9, 2010

Related U.S. Application Data

(63) Continuation of application No. 11/718,101, filed as application No. PCT/JP2005/002858 on Feb. 23, 2005, now Pat. No. 7,813,710.

(51) Int. Cl.
*H04B 1/10* (2006.01)

(52) U.S. Cl. ........ 455/301; 455/343.1; 455/130; 455/150.1; 333/101; 333/132; 330/310

(58) Field of Classification Search .......... 455/307, 455/343.1, 130, 150.1; 333/101, 132; 330/310
See application file for complete search history.

(56) References Cited

U.S. PATENT DOCUMENTS

| | | | |
|---|---|---|---|
| 4,246,553 A | 1/1981 | Pfleiderer | |
| 4,841,461 A * | 6/1989 | Yamamoto et al. | 702/197 |
| 4,852,080 A * | 7/1989 | Ohtake et al. | 370/295 |
| 5,519,349 A | 5/1996 | Nakahara | |
| 6,057,723 A | 5/2000 | Yamaji et al. | |
| 6,307,897 B1 | 10/2001 | Ohta et al. | |
| 6,495,998 B1 | 12/2002 | Terreault | |
| 7,020,186 B2 | 3/2006 | McReynolds et al. | |
| 7,057,472 B2 * | 6/2006 | Fukamachi et al. | 333/101 |
| 2003/0078018 A1 * | 4/2003 | Mudd et al. | 455/150.1 |
| 2004/0042539 A1 | 3/2004 | Vishakhadatta et al. | |

FOREIGN PATENT DOCUMENTS

| | | |
|---|---|---|
| JP | 05-183342 | 7/1993 |
| JP | 10-200376 | 7/1998 |
| JP | 10-215200 | 8/1998 |
| JP | 2001-186042 | 7/2001 |
| JP | 2004-032390 | 1/2004 |
| JP | 2005-020495 | 1/2005 |

* cited by examiner

*Primary Examiner* — Sanh Phu
(74) *Attorney, Agent, or Firm* — Antonelli, Terry, Stout & Kraus, LLP.

(57) ABSTRACT

A receiving circuit is provided for performing reception of a plurality of band signals and suppression of blockers that remain in the plurality of band signals being received and converted in frequency. The receiving circuit includes a first low-pass filter that has a first pole position to suppress blockers remaining in a received signal by the first pole position, and a second low-pass filter that has a second pole position to suppress blockers remaining in a signal that has passed through said first low-pass filter by the second pole position. A switch that switches on/off an input-output path including the filters so that the received signal passes through said first filter without passing through the second filter when receiving a first band signal, while the received signal passes through both filters when receiving a second band signal different from the first band signal.

10 Claims, 13 Drawing Sheets

RECEIVING CIRCUIT

CROSS-REFERENCE TO RELATED APPLICATIONS

This application is a continuation of U.S. application Ser. No. 11/718,101, filed Apr. 27, 2007, now U.S. Pat. No. 7,813,710 which application is a §371 national stage application of PCT/JP2005/002858, filed Feb. 23, 2005, the entire contents of which are incorporated herein by reference.

TECHNICAL FIELD

The present invention relates to a cellular phone, and in particular, to an effective technique especially suitably applied to a receiving circuit that receives a plurality of band wireless signals.

BACKGROUND ART

Recently, in the middle of rising of a market of cellular phones applied with the third generation system superior in transmission characteristics to the second generation system according to advance of multimedia application of communication, further cost reduction, size reduction, and lower power consumption are strongly desired in development of the cellular phone. WCDMA (Wide band CDMA) system, one system for the mobile phone of the third generation is specified by 3GPP.

According to a document "3GPP TS 25.101 Release 1999" (Non-Patent Document 1), bands I to II are allocated as UMTS (Universal Mobile Telecommunications System) frequency band. In a document "3GPP TS 25.101 Release5" (Non-Patent Document 2), band III is newly added, and since bands II and III use GSM band, Narrow Band Blocking specification that specifies GSM blocker is newly added. Currently, in the latest specification "3GPP TS 25.101 Release6" (Non-Patent Document 3), bands I to VI are specified and the specifications of the bands II to V define the Narrow Band Blocking.

Currently, a WCDMA-compliant cellular phone is generally compliant to band I and Narrow Band Blocking is not considered. And as its signal receiving system, a direct conversion system that directly converts a received signal from a wireless frequency band to a baseband frequency band is predominant. Generally, a blocker in the signal of the baseband frequency band is removed by a low-pass filter and only a signal component in a wanted band is extracted.

As a conventional art, regarding a filter in a receiving circuit which allows transmission and reception of multi-band wireless signals, an approach performing switching among a plurality of filters to extract only signal components in a wanted bandwidth is disclosed in Japanese Patent Laid-Open Publication No. 2004-32390 (Patent Document 1).

Since Patent Document 1 shows a configuration that restricting a high frequency signal bandwidth inputted from an antenna end to a wanted signal bandwidth by performing switching of band pass filters, it does not take into consideration the Narrow Band Blocking.

DISCLOSURE OF THE INVENTION

In 3GPP specification, however, bands I and VI have reference sensitivity of −117 dBm, and adjacent channel interference specified only in a WCDMA signal in a bandwidth of 3.84 MHz in a frequency bandwidth of 5 MHz corresponding to 1.92 MHz of a wanted frequency bandwidth in the base band.

On the other hand, bands II to V have a reference sensitivity such as −114 dBm or −115 dBm that has been relaxed by 2 to 3 dB as compared with band I or VI, but regarding the adjacent channel interference, the specification of the Narrow Band blocking of the offset frequencies of 2.7 MHz, 3.5 MHz, and 5.9 MHz from a central frequency of a received signal of band II is newly added from Release5. Regarding band III, also, the Narrow Band Blocking of the offset frequencies of 2.8 MHz, 3.6 MHz, and 6.0 MHz is specified.

To realize a reception of signals in bands II to V without deterioration of the sensitivity, it is necessary to suppress these Narrow Band Blockings sufficiently. But, in this operation, it is necessary to set the cutoff frequency of a low-pass filter near 1.92 MHz, that is the wanted frequency bandwidth, and adopt a special filter configuration in order to remove blockers, as a result, the special filter configuration may cause increase in current consumption.

And, in reception of bands I and VI, the adjacent blocking centered on 5 MHz can be suppressed sufficiently by setting the cutoff frequency low, but it may become difficult to achieve the reference sensitivity of −117 dBm due to degradation of the sensitivity at the filter. Therefore, it is desirable to set the cutoff frequency of the filter to be higher than frequencies at the reception of bands II to V.

011 Thus, optimal filter configurations are different for received bands respectively, and if the cutoff frequency is lowered for blocker removal and a special filter is used, a problem of sensitivity degradation at reception of bands I and VI, and a problem of increase in current consumption at a reception of any band occur.

Therefore, an object of the present invention is to provide a receiving circuit that is used for a cellular phone that is reduced in size and can realize low power consumption.

The afore-mentioned and other objects and novel features of the present invention will become apparent from the description of this specification and the accompanying drawings.

Summaries of representative ones of the inventions disclosed in the present application will be briefly explained as follows:

The present invention is a receiving circuit used in a cellular phone performing transmission and reception of a plurality of band wireless signals and includes a low-pass filter for removing blockers unnecessary for reception, wherein the low-pass filter is composed of a plurality of filters including a plurality of different circuit configurations and having different pole positions, and switching between a filter for blocker removal and a filter configuration with reduced sensitivity degradation is performed by combining a plurality of filters corresponding to received signal bands respectively, and power consumption is reduced by cutting power off unused filter portion in the filter configuration. By adopting filters so as to complementing their characteristics each other as the plurality of different filters, redundant filter configuration is not used, therefore, the area can be smaller to its necessity minimum, as a result, cost can be reduced.

Effects obtained by the representative ones of the inventions disclosed in the application will be briefly explained as follows.

According to the present invention, it is possible to provide a receiving circuit used in a cellular phone that is reduced in size and can realizes low power consumption by configuring a low-pass filter suitable for a reception band.

BRIEF DESCRIPTIONS OF THE DRAWINGS

BEST MODE FOR CARRYING OUT THE INVENTION

Embodiments of the present invention will be explained below in details with reference to the drawings. In all figures for explaining the embodiments of the present invention, the same members are attached with the same reference symbols and duplicate explanation thereof is omitted.

First Embodiment

Figure 1:
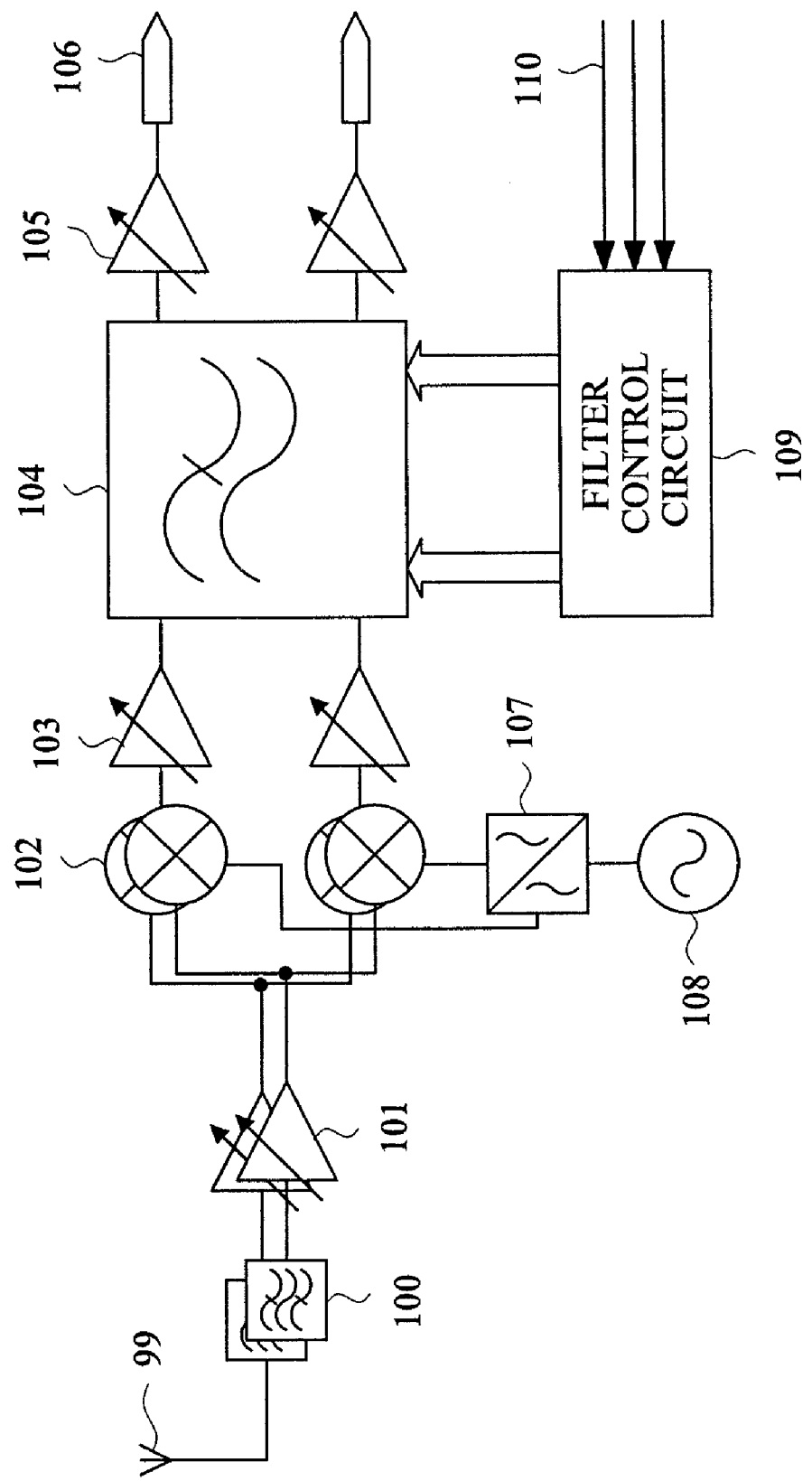
FIG. 1 is a diagram showing a configuration of a receiving circuit in a first embodiment of the present invention.

First, referring to FIG. 1, one example of a configuration and an operation of a receiving circuit in a first embodiment of the present invention will be explained. FIG. 1 shows a configuration of the receiving circuit in the first embodiment.

In FIG. 1, the receiving circuit in the embodiment is used in a cellular phone performing transmission and reception of a plurality of band wireless signals, and it is composed of an antenna input terminal 99, a band-pass filter 100, an LNA 101, a mixer 102, a first amplifier circuit 103, a low-pass filter 104, a second amplifier circuit 105, an output terminal 106, a 90-degree phase-shifting circuit 107, a local oscillator 108, a filter control circuit 109, and the like, and a band selection signal 110 is inputted into the filter control circuit 109.

The receiving circuit is composed of mixers 102, first amplifier circuits 103, low-pass filters 104, second amplifier circuits 105, and output terminals 106, which are paired, respectively, in order to process orthogonal signals of I/Q different in phase by 90 degrees.

The band-pass filter 100 allows passage of only a wanted bandwidth of signals from the antenna input terminal 99. The LNA 101 amplifies an output signal from the band-pass filter 100 with low noises. The local oscillator 108 outputs a signal oscillating at integer times a central frequency in a wanted channel bandwidth of output signals of the band-pass filter 100. The 90-degrees phase-shifting circuit 107 outputs an output signal I of the local oscillator 108 and phase-shifted by 90 degrees thereof, signal Q.

The mixer 102 mixes an output signal from the LNA 101 and an output signal I from the 90-degrees phase-shifting circuit 107. And, the mixer 102 is inputted with an output signal Q from the 90-degrees phase-shifting circuit 107.

The first amplifier circuit 103 amplifies an output signal from the mixer 102. The low-pass filter 104 allows passage of output signals from the first amplifier circuit 103 in only a wanted bandwidth. The second amplifier circuit 105 amplifies an output signal from the low-pass filter 104 and output it to the output terminal 106 as a wanted signal. The filter control circuit 109 controls the low-pass filter 104 according to a band selection signal 110.

Especially, the low-pass filter 104 is composed of a plurality of filters including a different circuit configuration and having a plurality of different pole positions, and a low-pass filter with desired characteristic corresponding to each reception band is configured by combining these filters in order to remove blockers unnecessary for signal reception. A filter processing that allows passage of only a wanted signal can be performed by switching the filter configuration of the low-pass filter 104 to an optimal configuration by band selection signal 110, and simultaneously, power consumption can be reduced by cutting power off at unused filter portion.

In an operation of the receiving circuit, a received signal inputted from the antenna input terminal 99 is firstly inputted into the band-pass filter 110 which allows passage of only a signal in a desired band. Further, the signals are inputted from the band-pass filter 100 into LNAs 101 corresponding to the respective bands. The signal amplified by the LNA 101 with low noises is mixed in the mixer 102 to a signal obtained by phase-shifting a signal from the local oscillator 107 by 90 degrees in the 90-degrees phase-shifting circuit 107 and directly converted into a baseband frequency. The converted received signal is inputted into the first amplifier circuit 103, and then passes through the low-pass filter 104 to remove an unnecessary bandwidth. Thereafter, the signal is amplified in the second amplifier circuit 105 and then outputted from the output terminal 106.

Figure 2:
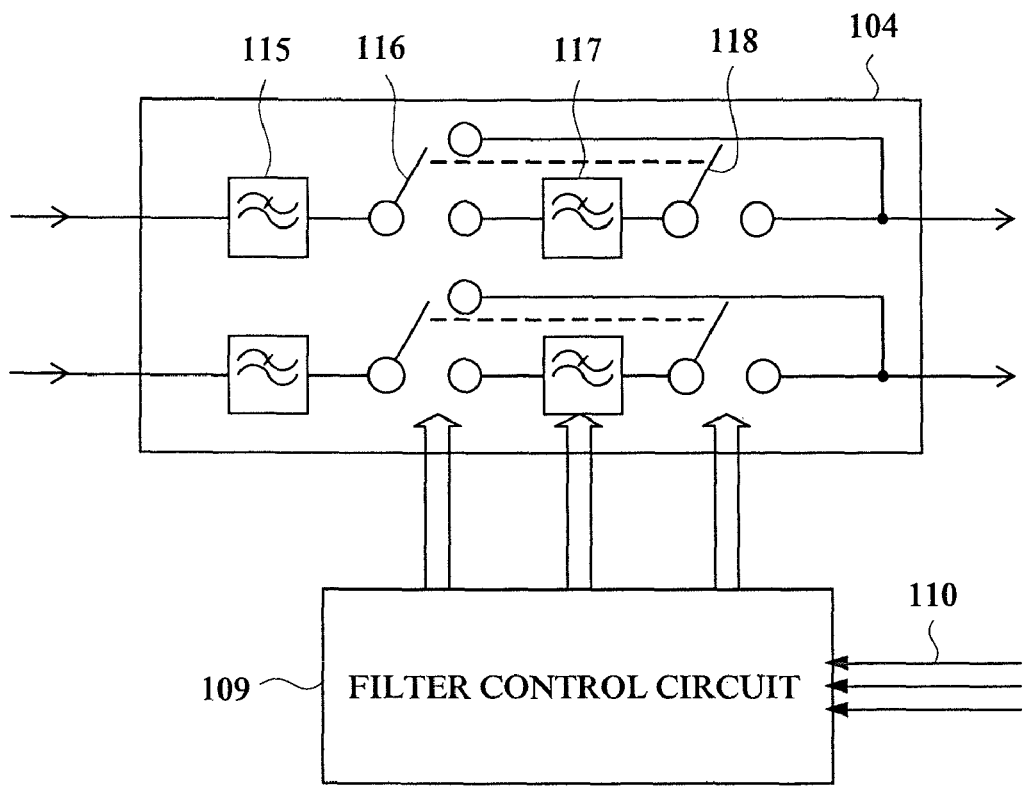
FIG. 2 is a diagram showing a configuration of a low-pass filter in the receiving circuit in the first embodiment of the present invention.

Next, referring to FIG. 2, one example of a configuration and an operation of the low-pass filter will be explained. FIG. 2 shows the configuration of the low-pass filter. Here, a tangible configuration example of a low-pass filter in a cellular phone which can receive bands I and III of UMTS is shown.

In FIG. 2, the low-pass filter 104 is composed of first filters 115, first switches 116, second filters 117, second switches 118, and the like, which are paired corresponding to I/Q signals.

The first filter 115 and the second filter 117 are filters that have different pole positions from each other. The first filter 115 is a filter having an approximately flat characteristic in a signal receiving bandwidth of 1.92 MHz. The second filter 117 is a filter that achieves suppression of Narrow Band Blocking of 2.8 MHz, 3.6 MHz, and 6 MHz by combination with the first filter 115.

The filter control circuit 109 controls the first switch 116 and the second switch 118 that are provided before and after the second filter 117 according to a band selection signal 110 and performs power-on and power-off of the first filter 117 and the second filter 118.

In reception of band I, the Narrow Band Blocking is not defined, so that only a wanted signal can be extracted from the received signal without passing the received signal through the second filter 117. That is, the first switch 116 and the second switch 118 are switched by the filter control circuit 109 such that an output signal from the first filter 117 is inputted into the second amplifier circuit 105 posteriorly connected thereof. And, by turning off a power of the second filter 117, power consumed in the second filter 117 can be reduced. Further, since a frequency characteristic of a pass bandwidth of the first filter 115 is flat, influence to reference sensitivity is small, so the signal reception quality can be improved.

On the other hand, in reception of band III, the Narrow Band Blocking is defined, therefore, it is possible to remove blocker to extract only a wanted signal by inputting an output signal from the first filter 115 into the second filter 117. That is, the first switch 116 is switched by the filter control circuit 109 such that an output signal from the first filter 115 is inputted into the second filter 117 and the second switch 118 is switched by the filter control circuit 109 such that an output signal from the second filter 117 is inputted into the second amplifier circuit 105 posteriorly connected thereof. As described above, in order to remove blocker, by adopting a configuration for combining the first filter 115 and the second filter 117, the first filter 115 utilized for band I can be also utilized for band III, so that a size of a filter newly configured for band III reception can be reduced and an area of a receiving circuit can be suppressed.

Figure 3:
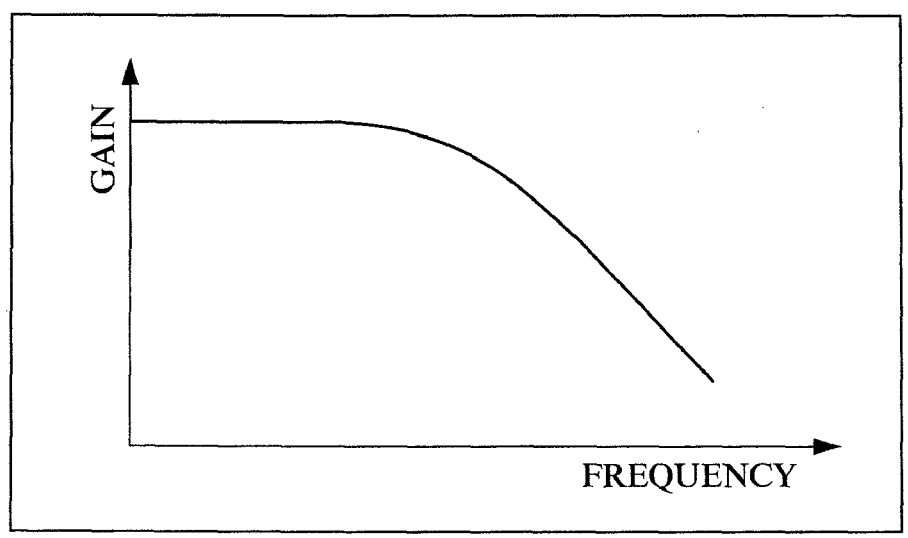
FIG. 3 is a diagram showing a frequency characteristic of a first filter in the receiving circuit in the first embodiment of the present invention.
Figure 4:
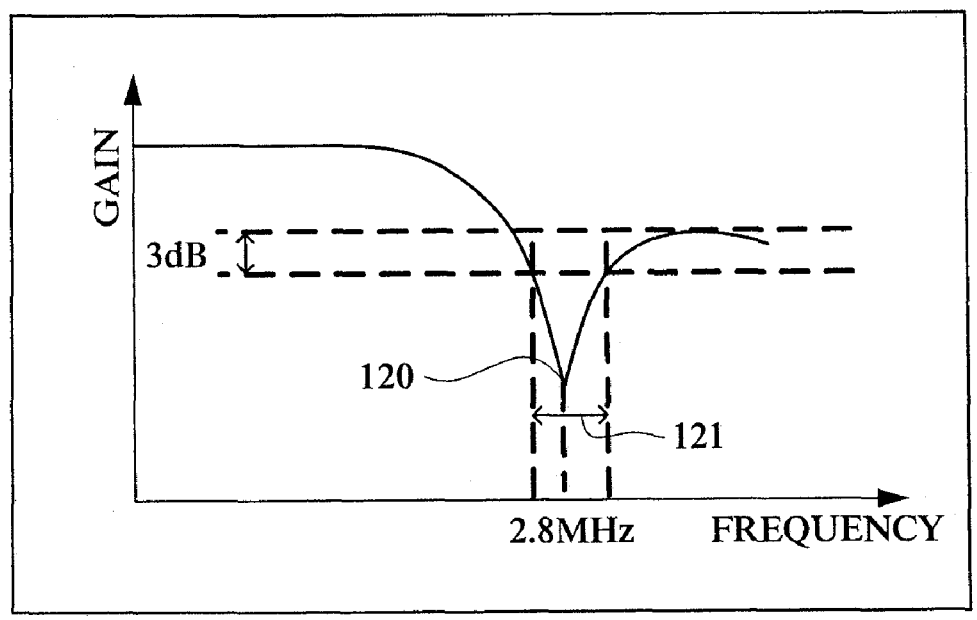
FIG. 4 is a diagram showing a frequency characteristic of a second filter in the receiving circuit in the first embodiment of the present invention.
Figure 5:
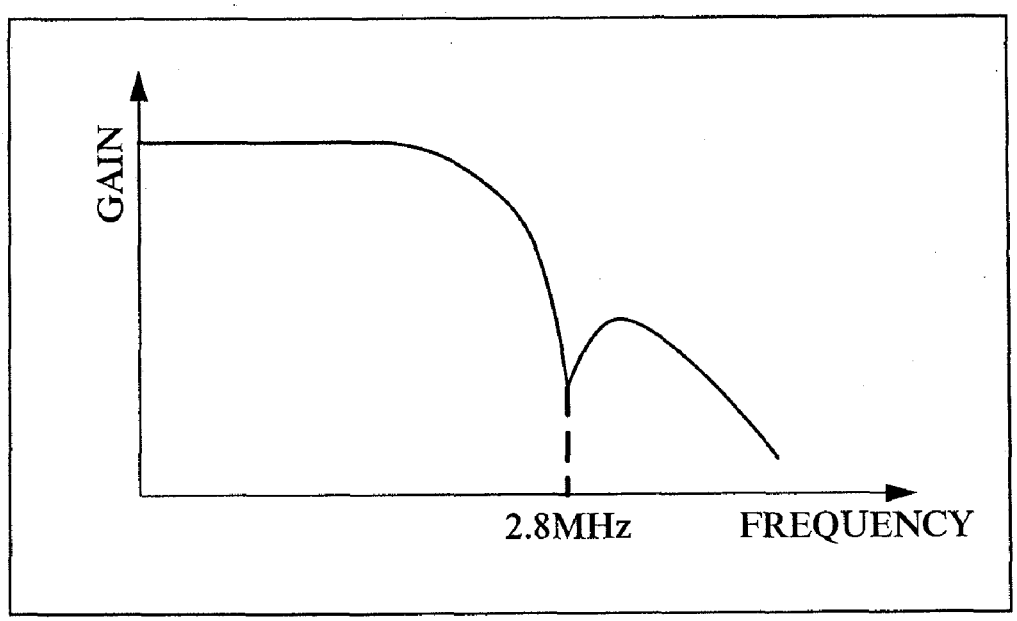
FIG. 5 is a diagram showing a frequency characteristic obtained when the first filter and the second filter are combined in the receiving circuit in the first embodiment of the present invention.
Figure 6:
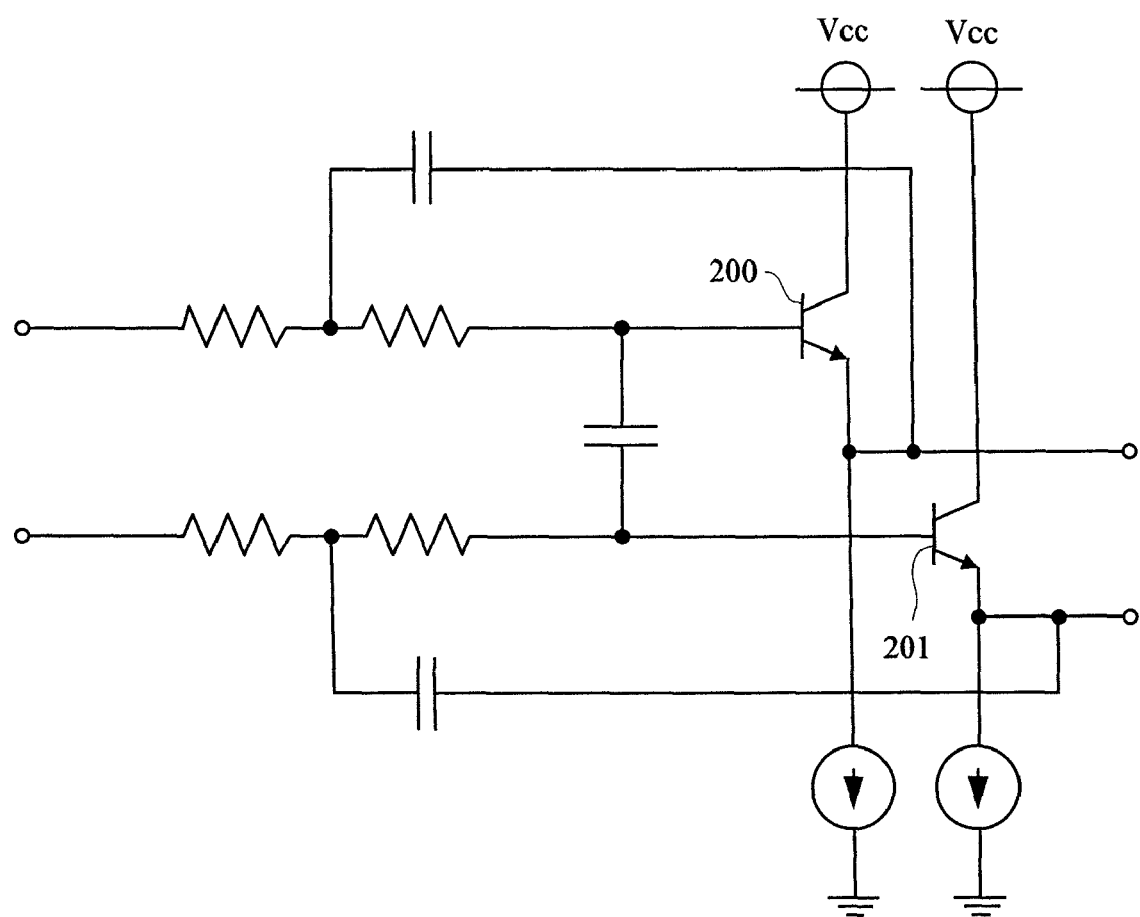
FIG. 6 is a diagram showing a tangible circuit configuration of the first filter in the receiving circuit in the first embodiment of the present invention.
Figure 7:
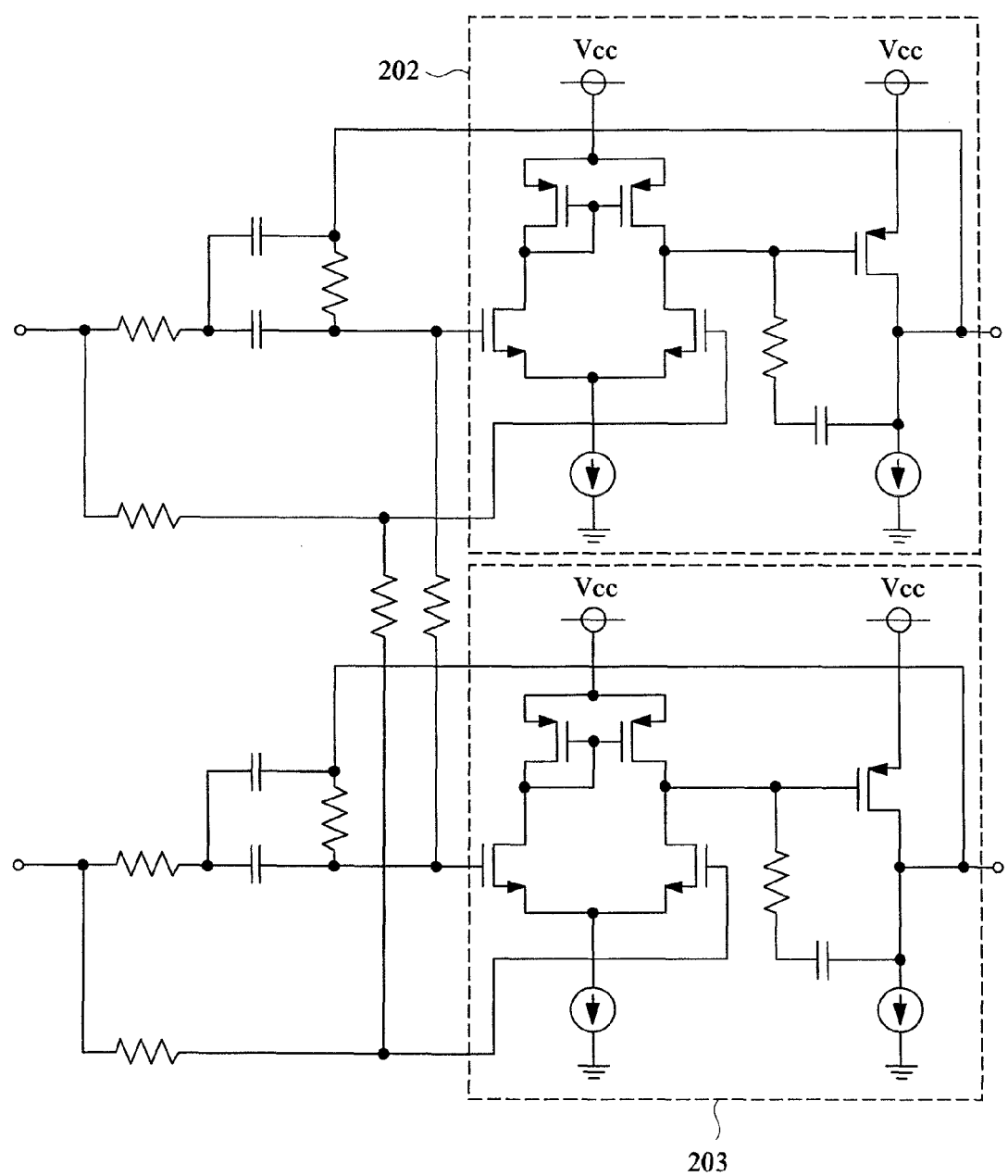
FIG. 7 is a diagram showing a tangible circuit configuration of the second filter in the receiving circuit in the first embodiment of the present invention.

Next, referring to FIG. 3 to FIG. 5, examples of frequency characteristics of the first filter, the second filter, and a combination of the first filter and the second filter will be explained. FIG. 3 shows a frequency characteristic of the first filter, FIG. 4 shows a frequency characteristic of the second filter, and FIG. 5 shows a frequency characteristic obtained when the first filter and the second filter are combined. FIG. 6 shows a tangible circuit configuration of the first filter and FIG. 7 shows a tangible configuration of the second filter.

The frequency characteristic of the first filter 115, variation of gain against frequency appears as shown in FIG. 3. The frequency characteristic of the second filter 117 appears as shown in FIG. 4. In FIG. 4, a notch frequency 120 is a frequency where an attenuation amount due to the filter response changes most rapidly, and a notch bandwidth 121 is a bandwidth between a lower side frequency of the attenuation amount lower than the attenuation amount of a blocking bandwidth of a notch filter by 3 dB and a higher side frequency thereof lower than the same by 3 dB.

Regarding tangible circuits of the first filter 115 and the second filter 117, a Butterworth filter having a flat frequency characteristic in a signal receiving bandwidth can be used as the first filter 115. A Chebyshev filter having an on-channel ripple which induces sensitivity degradation which causes no problem may be used. As a basic configuration of the Butterworth filter, a circuit shown in FIG. 6 can be proposed. If this configuration is used, since emitter followers 200 to 201 are utilized therein, lower power consumption and lower noise as compared with a system using an operational amplifier can be realized.

A notch filter having a characteristic that can obtain a rapid attenuation amount near a blocker frequency can be used as the second filter 117 in order to remove blocker signals. The notch filter can be realized by using, for example, a reversed Chebyshev filter or an elliptic filter, and it seems that, when an on-channel frequency characteristic is important, the former filter is used, on the other hand, the latter filter is used in order to obtain an attenuation amount of blocker at a frequency nearer the reception bandwidth. As a tangible circuit of the notch filter, a circuit shown in FIG. 7 is proposed. By configuring all passive elements in the operational amplifiers 202 to 203 with MOSFETs, area can be reduced. The notch filter is provided after an initial stage filter of a plurality filters selected and before a final stage filter thereof.

In a design of the second filter 117, a characteristic of the second filter 117 obtained when it is combined with the first filter 115 appears as shown in FIG. 5 by setting the notch bandwidth 121 in FIG. 4 to include 2.8 MHz offset frequency nearest the reception bandwidth at the Narrow Band Blocking. It is possible to set the attenuation amount at a frequency of 2.8 MHz to be remarkably large as compared with the characteristic of only the first filter 115. Accordingly, this is especially effective to suppress the Narrow Band Blocking.

Since the specification of the reference sensitivity in band III is higher than that of band I by 3 dB, a cutoff frequency of a low-pass filter obtained by combining the first filter 115 and the second filter 117 becomes lower than 1.92 MHz of the reception bandwidth, so that degradation of the reference sensitivity is not problematic even if it occurs. And, even if the notch frequency of the second filter 117 is not set to the blocker frequency, if the blocker frequency is set to be included in the notch bandwidth 121, suppression of the Narrow Band Blocking can be achieved by utilizing a low-pass filter obtained by combining the first filter 115 and the second filter 117.

Therefore, though the receiving circuit for bands I and III of UMTS has been shown in the embodiment, this configuration can be applied to a case receiving any band of bands I to VI. In this case, a configuration in which bands I and VI are received using the first filter 115, and bands II to V are received using the second filter 117, can be adopted.

In not only the case where signal to be removed is the offset frequency of 2.8 MHz in band III but also a case that signals to be removed are concentrated to a specific frequency band, reduction of power consumption is possible by adopting a configuration where a notch filter with notch bandwidth at the frequency band and a filter without notch frequency are combined, and switching the filter configuration depending on whether received signal includes blocker or not. In the case where blockers are concentrated to a plurality of frequency bands, by incorporating filters having notch frequencies of the same number as that of frequency bands concentrated and switching these filters, blockers can be suppressed by low-pass filter with low power consumption and reduced area.

Figure 8:
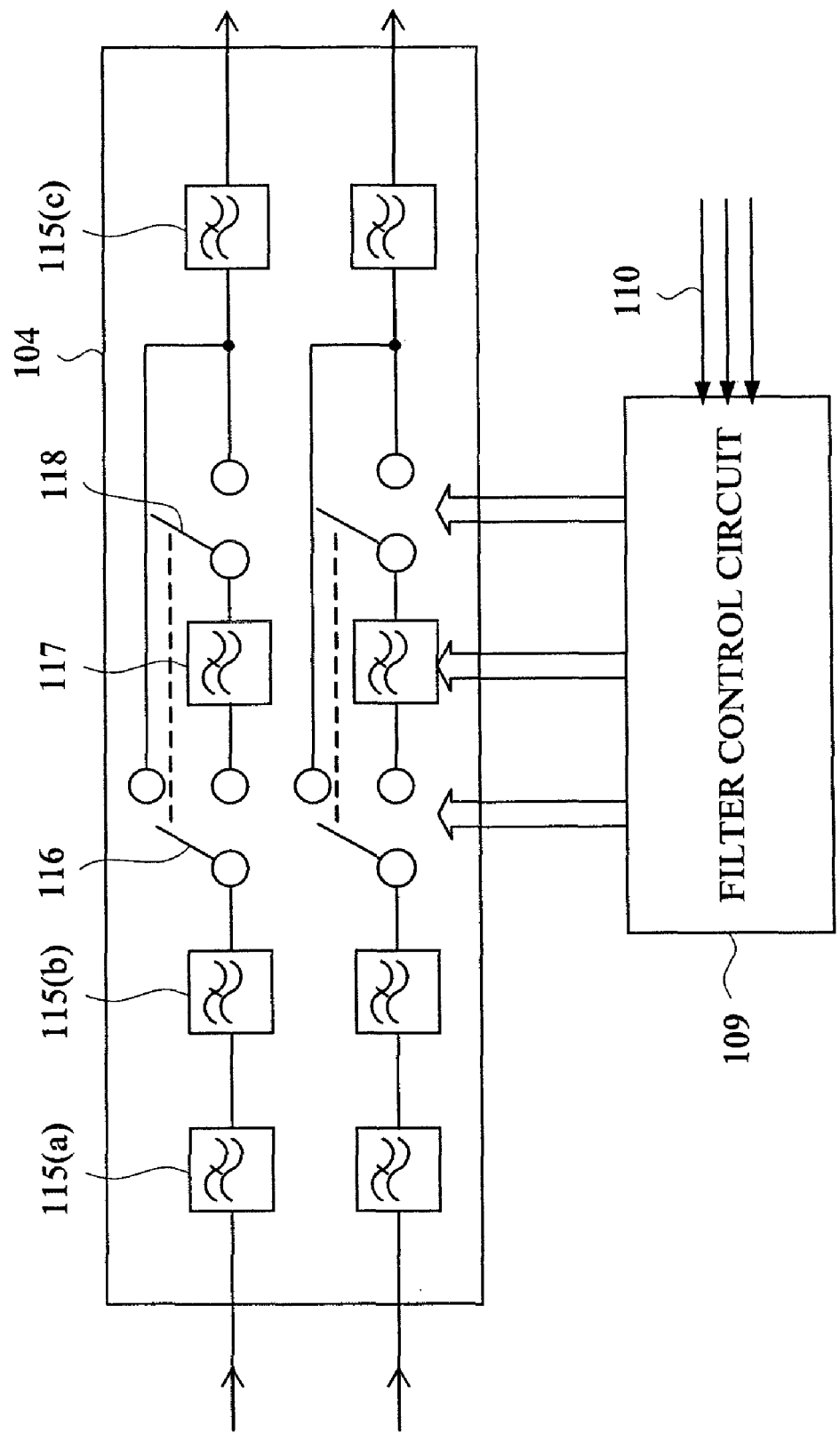
FIG. 8 is a diagram showing a configuration of another low-pass filter in the receiving circuit in the first embodiment of the present invention.

FIG. 8 shows another tangible configuration example of the first embodiment in which the first filter is broke down.

In FIG. 8, the first filter is composed of a filter 115(a), a filter 115(b), and a filter 115(c), and the filter 115(a), the filter 115(b), the filter 115(c), and the second filter 117 are filters having different pole positions, respectively. The filter 115 (a), the filter 115(b), and the filter 115(c) are filter having approximately flat characteristic in a 1.92 MHz reception bandwidth, and the second filter is a filter that can suppress Narrow Band Blockings of 2.8 MHz, 3.6 MHz, and 6 MHz in combination with the filter 115(a), the filter 115(b), and the filter 115(c). The second filter is interposed between the filter 115(b) and the filter 115(c), and switches are provided before and after the second filter. With this configuration, it is possible to reduce influence of noise generated at the second filter at a band III reception. In the case where the second filter is composed of an operational amplifier of a MOSFET such as shown in FIG. 7, flicker noise of the MOSFET is problematic, but the above-mentioned configuration where the second filter is interposed between the filter 115(b) and the filter 115(c) is more effective for reducing the influence.

The second filter may be connected posteriorly to the filter 115(c), in such a case, an operational amplifier with larger range of input and output should be used as the operational amplifier constituting the second filter.

The control circuit 109 controls the first switch 116 and the second switch 118 provided before and after the second filter according to a band selection signal 110 and performs power-on and power-off of the first and second filters.

Second Embodiment

Figure 9:
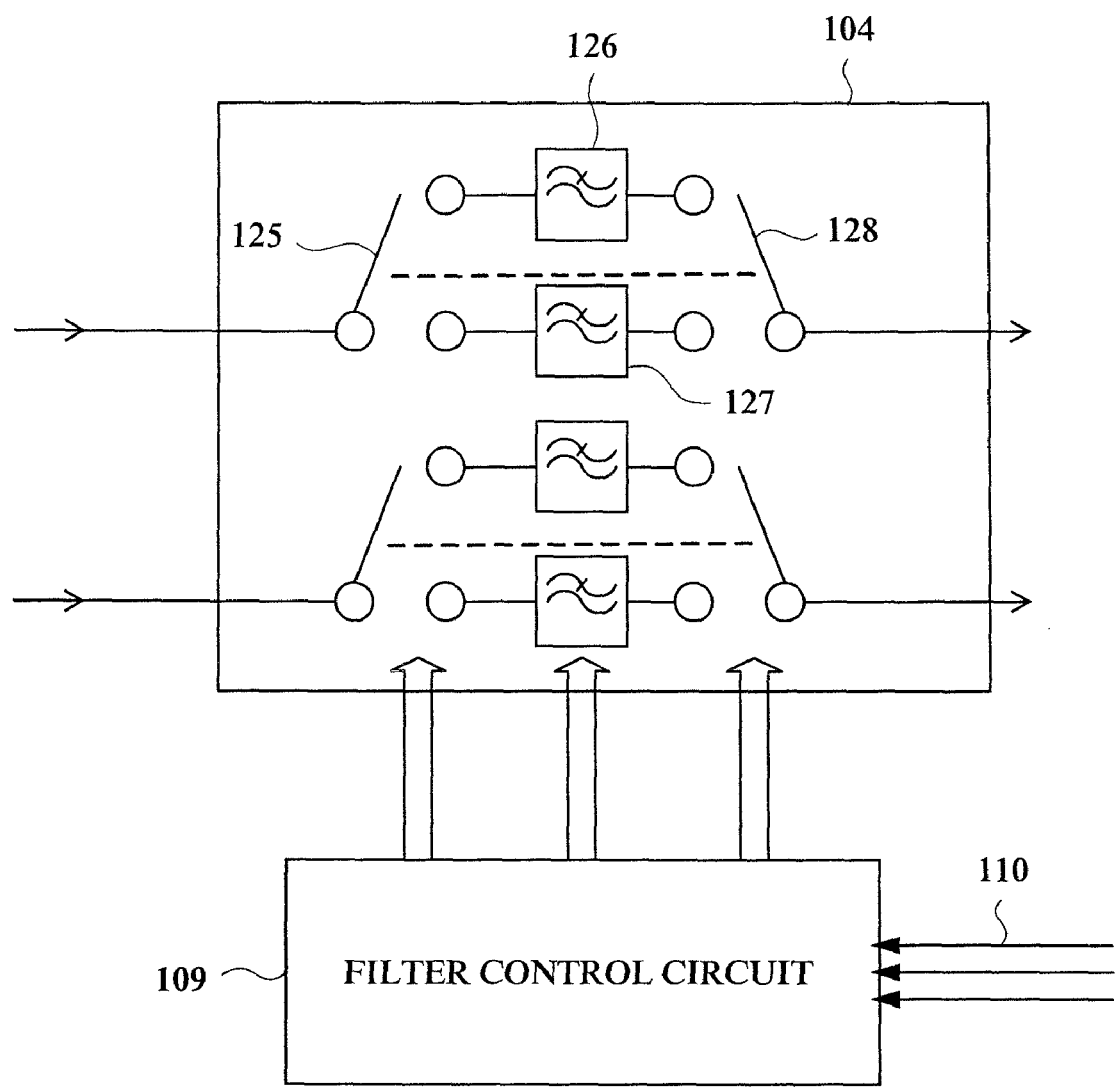
FIG. 9 is a diagram showing a configuration of a low-pass filter in a receiving circuit in a second embodiment of the present invention.

Referring to FIG. 9, one example of configuration and operation of a low-pass filter in a receiving circuit of a second embodiment of the present invention will be explained. FIG. 9 shows the configuration of the low-pass filter.

Since the receiving circuit in this embodiment is similar to that shown in FIG. 1 showing the first embodiment, detailed explanation thereof is omitted. Here, a tangible configuration example of a low-pass filter in a receiving circuit that can receive bands I and III of UMTS is shown.

In FIG. 9, a low-pass filter 104 in the embodiment is composed of a first switch 125, a first filter 126, a second filter 127, a second switch 128, and the like, and its different point from the first embodiment is that the first filter 126 and the second filter 127 are connected in parallel.

The first filter 126 is a filter used at a reception of band I and the second filter 127 is a filter used at a reception of band III. The first filter 126 is a filter having an approximately flat characteristic in a signal reception bandwidth of 1.92 MHz. The second filter 127 is a filter that can suppress Narrow Band Blocking of 2.8 MHz, 3.6 MHz, and 6 MHz.

The filter control circuit 109 controls a first switch 125 and a second switch 128 provided before and after the first filter 126 and the second filter 127 by a band selection signal 110, and performs power-on and power-off of the first filter 126 and the second filter 127.

A case of receiving band I will be explained. First, band selection signal 110 is inputted into the filter control circuit 109 so as to receive band I. The filter control circuit 109 performs switching of the first switch 125 and the second switch 128 according information received. Since the first filter 126 is for band I and the second filter 127 is for band III, the filter control circuit 109 connects the first switch 125 and the second switch 128 to the side of the first filter 126. At the same time, the filter control circuit 109 performs power-on of the first filter 126 and the power-off of the second filter 127. Thereby, a received signal inputted from the first amplifier circuit 103 anterior thereof flow in the first filter 126, as a result, only a desired bandwidth of band I signals can be caused to pass.

On the other hand, in reception of band III, a band selection signal 110 is inputted into the filter control circuit 109 so as to receive band III. The filter control circuit 109 performs switching of the first switch 125 and the second switch 128 according to information received. Since the first filter 126 is for band I, and the second filter 127 is for band III, the filter control circuit 109 connects the first switch 125 and the second switch 128 to the side of the second filter 127. At the same time, the filter control circuit 109 performs power-on of the second filter 127 and performs power-off of the first filter 126. Thereby, a received signal inputted from the first amplifier circuit 103 anterior thereof flow in the second filter 127, as a result, only a desired bandwidth of band III signals can be caused to pass.

Therefore, according to the embodiment, the first filter 126 for band I is selected at a reception of band I, and the second filter 127 for band III is selected at a reception of band III, so that only wanted signals can be received. At this time, since a design for a filter for each band reception does not require consideration about specifications for the other bands, it is possible to design the filter with a minimum current value for satisfying the specification thereof.

In the embodiment, though bands I and III have been explained, a receiving circuit that can suppress blockers with lower power consumption can be designed by incorporating switchable filters of the number corresponding to the number of bands and switching these filters.

Third Embodiment

Figure 10:
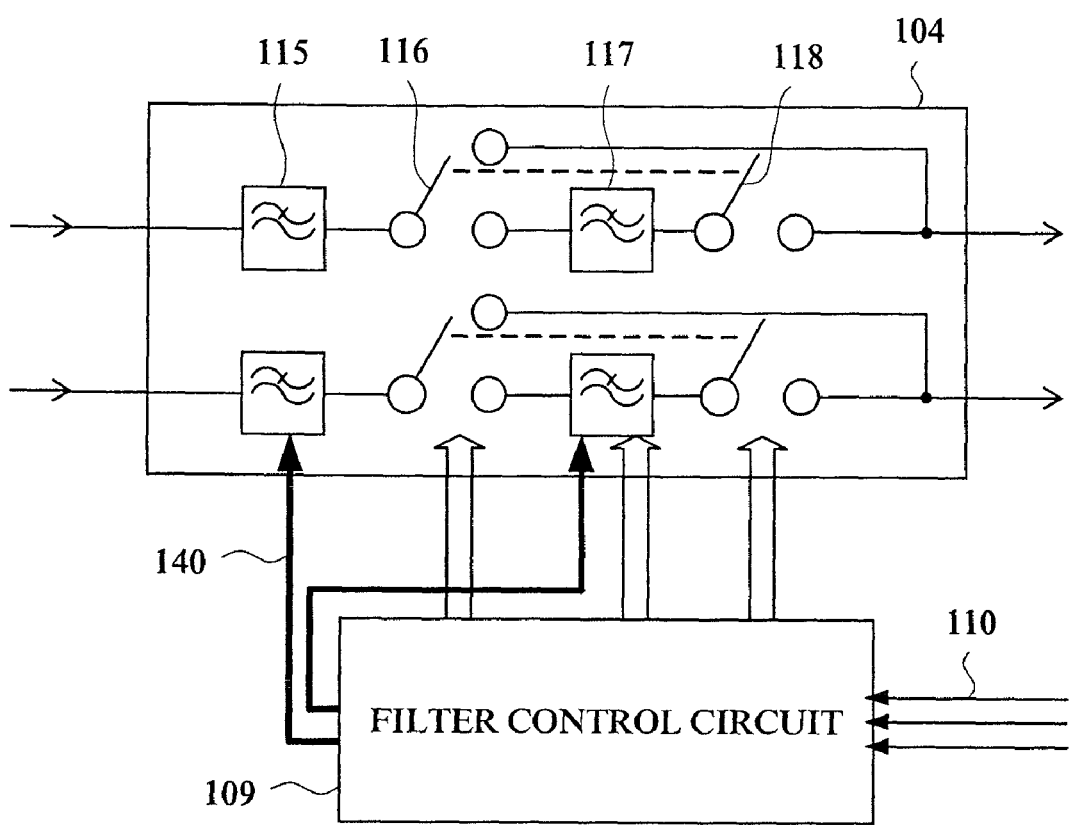
FIG. 10 is a diagram showing a configuration of a low-pass filter in a receiving circuit in a third embodiment of the present invention.

Referring to FIG. 10, one example of configuration and operation of a low-pass filter in a receiving circuit of third embodiment of the present invention will be explained. FIG. 10 shows the configuration of the low-pass filter.

Since the receiving circuit in this embodiment is similar to that shown in FIG. 1 showing the first embodiment, detailed explanation thereof is omitted.

In the receiving circuits having the configurations of the first and second embodiments, in reception of bands I, II, and III signals of UMTS, there is a difference such that in reception of band II signal, an offset frequency of a blocker signal is 2.7 MHz, while in reception of band III signal, an offset frequency of a blocker signal is 2.8 MHz, so, by adopting a configuration that the notch frequency of the second filter constituting the low-pass filter 104 receiving band II and band III signals can be switched to the frequency of the blocker signal, a filter with a higher reference sensitivity can be designed.

Referring to FIG. 10, one example of a configuration and an operation of a low-pass filter 104 in this embodiment will be explained below. The low-pass filter 104 in the embodiment is an example where a function for performing adjustment of the cutoff frequency is added to the configuration shown in FIG. 2 showing the first embodiment.

In FIG. 10, a notch frequency adjusting signal 140 outputted from the filter control circuit 109 is a control signal for adjusting the cutoff frequency of the first filter 115 and the notch frequency of the second filter 117.

In reception of band II signal, the offset frequency of a blocker nearest the signal receiving bandwidth in the Narrow Band Blocking is 2.7 MHz, therefore, it is preferable that 2.7 MHz is included in the notch bandwidth. At a reception of band II signal, a signal for band II reception is inputted into the filter control circuit 109 according to a band selection signal 110. The filter control circuit 109 adjusts the cutoff frequency of the first filter 115 according to a notch frequency adjusting signal 140 and performs setting such that 2.7 MHz is included in the notch bandwidth of the second filter 117. Like the reception of band III signal shown in the first embodiment, the first and second switches 116 and 118 are switched by the filter control circuit 109 such that a received signal is inputted into the second filter 117 and outputted to the second amplifier circuit 105 posterior thereof.

In reception of band III signal, the offset frequency of a blocker nearest the signal receiving bandwidth in the Narrow Band Blocking is 2.8 MHz, therefore, it is preferable that 2.8 MHz is included in the notch bandwidth. At a reception of band III signal, a signal for band III reception is inputted into the filter control circuit 109 according to a band selection signal 110. The filter control circuit 109 adjusts the cutoff frequency of the first filter 115 according to a notch frequency adjusting signal 140 and performs setting such that 2.8 MHz is included in the notch bandwidth of the second filter 117. Like the reception time of band III signal shown in the first embodiment, the first and second switches 116 and 118 are switched by the filter control circuit 109 such that a received signal is inputted into the second filter 117 and outputted to the second amplifier circuit 105 posterior thereof.

Therefore, according to the embodiment, by utilizing the filter configured above, it becomes possible at reception of bands II and III signals to use filters with notch frequencies switched to offset frequencies of respective specifications, therefore, it is unnecessary to configure a notch filter newly, so that a design with area suppressed can be realized.

Fourth Embodiment

Figure 11:
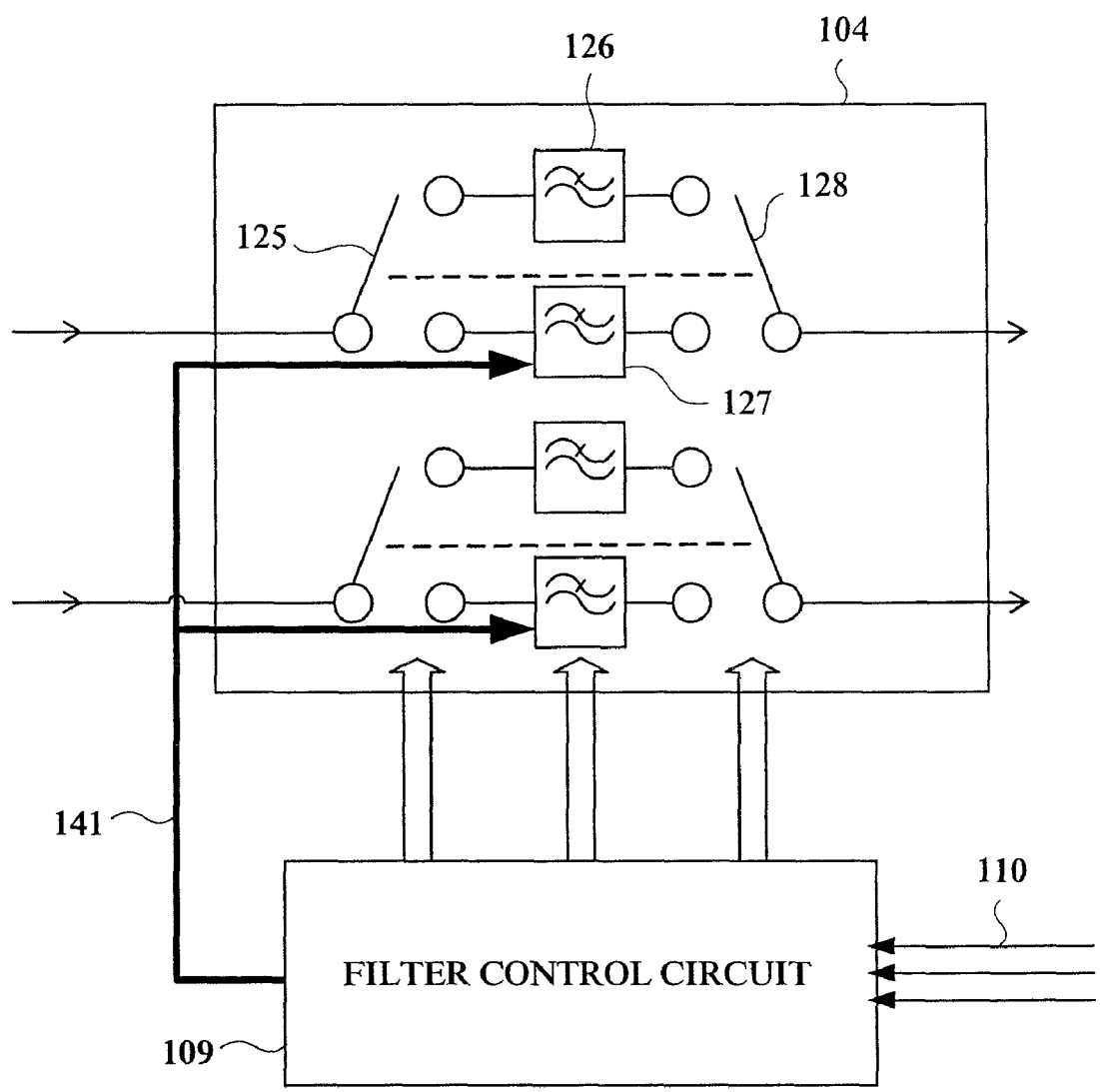
FIG. 11 is a diagram showing a configuration of a low-pass filter in a receiving circuit in a fourth embodiment of the present invention.

Referring to FIG. 11, one example of configuration and operation of a low-pass filter in a receiving circuit in a fourth embodiment of the present invention will be explained. FIG. 11 shows the configuration of the low-pass filter.

Since the receiving circuit in this embodiment is similar to that shown in FIG. 1 showing the first embodiment, detailed explanation thereof is omitted.

In FIG. 11, the low-pass filter 104 in the embodiment is an example where a function for performing adjustment of the cutoff frequency is added to the configuration of the second embodiment shown in FIG. 6.

In FIG. 11, a notch frequency adjusting signal 141 outputted from the filter control circuit 109 is a control signal for adjusting a notch frequency of the first filter 127.

Like the third embodiment, the offset frequency of a blocker nearest the signal receiving bandwidth in the Narrow Band Blocking is 2.7 MHz at a reception of band II signal, therefore, it is preferable that 2.7 MHz is included in the notch bandwidth. At a reception of band II signal, a signal for band II reception is inputted into the filter control circuit 109 by a band selection signal 110. The filter control circuit 109 performs setting such that 2.7 MHz is included in the notch bandwidth of the second filter 127 by notch frequency adjusting signal 141. And, like the reception of band III signal shown in the second embodiment, the first and second switches 125 and 128 are switched by the filter control circuit 109 such that a received signal is inputted into the second filter 127 and outputted to the second amplifier circuit 105 posterior thereof.

At the reception of band III signal, the offset frequency of a blocker nearest the signal receiving bandwidth in the Narrow Band Blocking is 2.8 MHz, therefore, it is preferable that 2.8 MHz is included in the notch bandwidth. At a reception of band III signal, a signal for band III reception is inputted into the filter control circuit 109 by a band selection signal 110. The filter control circuit 109 performs setting such that 2.8 MHz is included in the notch bandwidth of the second filter 127 by notch frequency adjusting signal 140. And, like the reception of band III signal shown in the second embodiment, the first and second switches 125 and 128 are switched by the filter control circuit 109 such that a received signal is inputted into the second filter 127 and outputted to the second amplifier circuit 105 posterior thereof.

Therefore, according to the embodiment, by utilizing the filter configured above, even in the filter configuration shown in the second embodiment, it is possible at reception of bands II and III to adjust filters to include offset frequencies of respective specifications in notch bandwidths, therefore, it is unnecessary to configure a notch filter newly, so that a design with area suppressed can be realized.

In the embodiment, though the receiving circuit compliant with the bands I, II, and III have been explained, the present invention is not limited to this embodiment, and in the case where the offset frequencies of blockers are different in different bands, by changing the cutoff frequency of the same filter characteristic, area increase caused by manufacturing of redundant filter can be avoided, as a result, a receiving circuit with small area can be provided.

Fifth Embodiment

Figure 12:
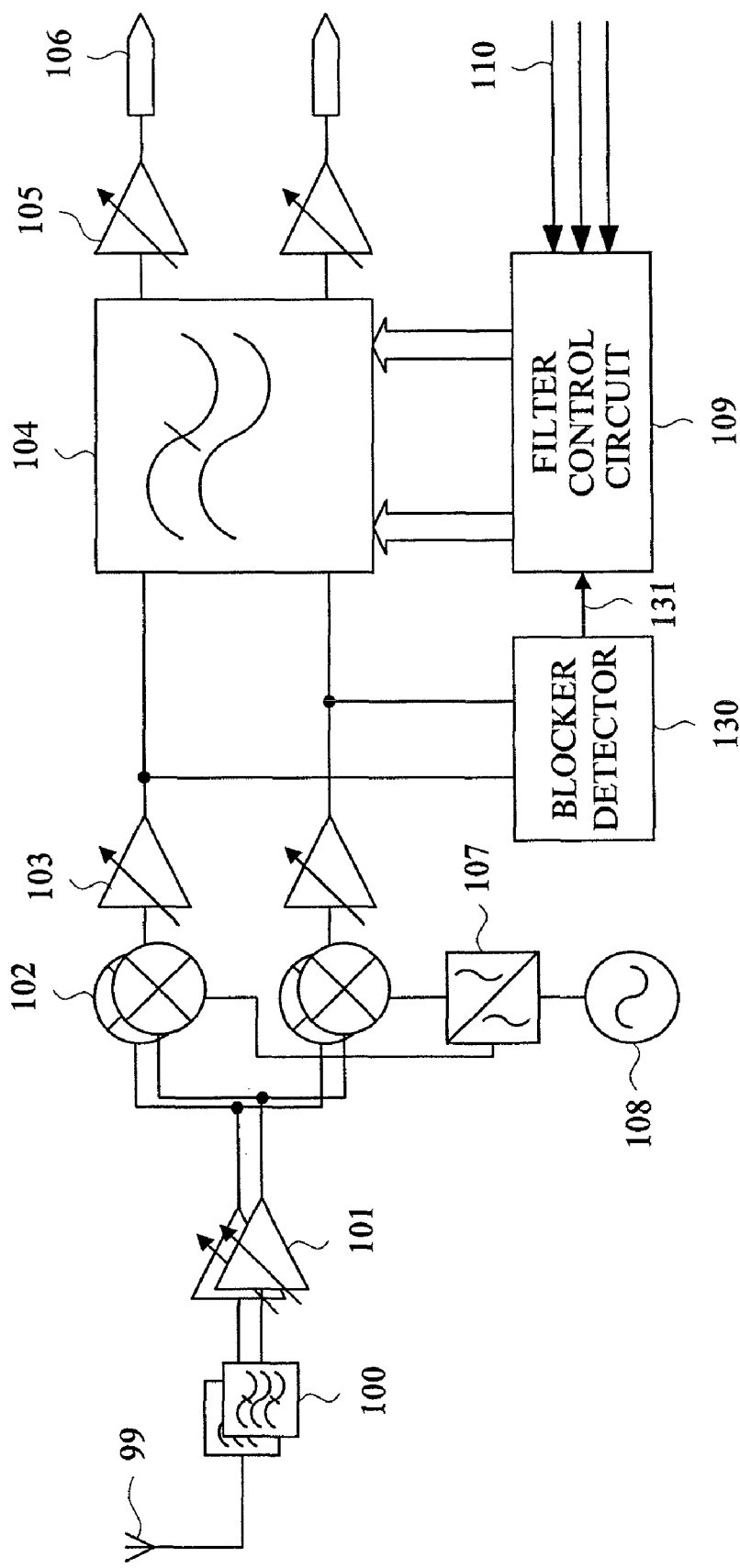
FIG. 12 is a diagram showing a configuration of a receiving circuit in a fifth embodiment of the present invention.

Referring to FIG. 12, one example of configuration and operation of a receiving circuit in a fifth embodiment of the present invention will be explained. FIG. 12 shows the configuration of the receiving circuit.

In FIG. 12, since the receiving circuit in the embodiment is similar to that shown in FIG. 1 except that it has a blocker detector 130 detecting blockers added to the configuration shown in FIG. 1 showing the first embodiment, detailed explanation thereof is omitted here. The configuration of the low-pass filter can be applied with any configuration of the first to fourth embodiments (FIG. 2, FIG. 8, FIG. 9, FIG. 10, and FIG. 11).

By inputting signal between the first amplifier circuit 103 and the low-pass filter 104 into the blocker detector 130, determination whether a level of an offset blocker of the Narrow Band Blocking is equal to or more than a defined value or not is made by the blocker detector 130, and when the level is equal to or more than the defined value, it is determined that suppression of Narrow Band Blocking is required and a filter selection signal 131 is transmitted to the filter control circuit 109, so that the configuration of the filter is switched according to the filter selection signal 131. In this way, passage of only a wanted signal is made possible by performing switching of filters according to presence/absence of a blocker.

The configuration allows, even when a signal in a band where a blocker is defined is received, by switching a configuration of the filter according to presence/absence of a blocker, and when any blocker is not detected, by turning off the power of the low-pass filter for blocker removal, to reduce power consumption.

One example of a receiving circuit of a cellular phone that can receive signals for bands I and III of UMTS will be explained below with reference to FIG. 12.

When a blocker of 2.8 MHz is included in a received signal, a filter selection signal 131 is inputted into the filter control circuit 109 by the blocker detector 130. In this case, the filter selection signal 131 corresponds to the band III selection signal in aforementioned embodiment. The filter control circuit 109 controls the low-pass filter 104 according to a filter selection signal 131 so that a switch in the low-pass filter 104 is switched to a state for band III reception. While blockers are being detected, band III selection signals are outputted from the filter selection signal 131, so that the filter configuration is maintained for band III and the reception signal is outputted to the second amplifier circuit 105 after blockers of 2.8 MHz are removed from the reception signal.

On the other hand, when a blocker of 2.8 MHz is not detected in the received signal, blockers with less than a defined value are inputted to the blocker detector 130, so that a filter selection signal 131 corresponding to the selection signal for band I in aforementioned embodiment is inputted into the filter control circuit 109. The filter control circuit 109 controls the low-pass filter 104 according to the filter selection signal 131 so that a switch in the low-pass filter 104 is switched to a state for band I reception. While any blocker is not detected, a selection signal for band I is outputted from the filter selection signal 131, so that the configuration of the filter is maintained for band I, the filter for band III is powered OFF, and the reception signal can be outputted to the second amplifier circuit 105 with a low power consumption.

Therefore, in the configuration according to the embodiment, since the signal receiving filter is selected according to the detection result of a blocker even during signal reception at the reception frequency for band III, it is unnecessary to use the filter for band III always, and when any blocker is not detected, a signal can be received with low power consumption.

Sixth Embodiment

Figure 13:
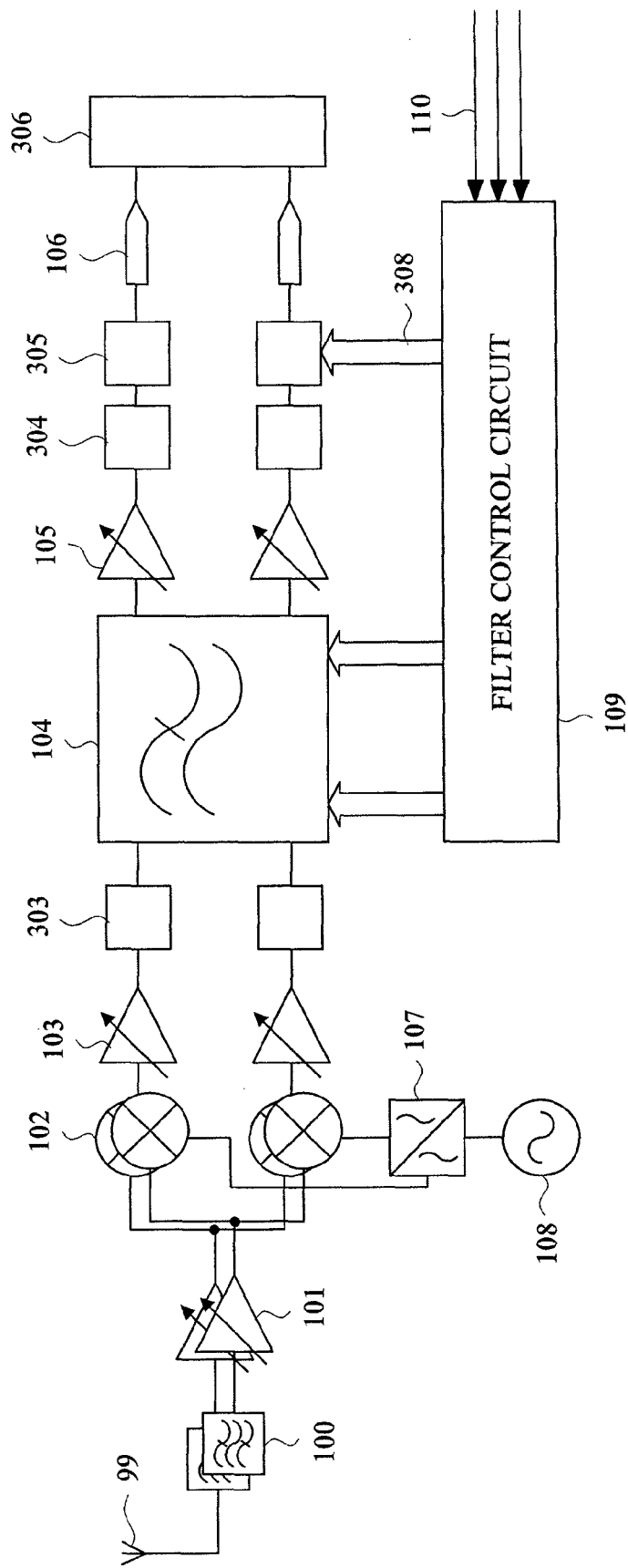
FIG. 13 is a diagram showing a configuration of a receiving circuit in a sixth embodiment of the present invention.

Referring FIG. 13, one example of configuration and operation of a receiving circuit in a sixth embodiment of the present invention will be explained. FIG. 13 shows the configuration of the receiving circuit, where the same blocks as that in the FIG. 1 are attached with the same reference symbols.

In FIG. 13, reference symbol 99 denotes an antenna input terminal, 100 denotes band-pass filter, 101 denotes an LNA, 102 denotes a mixer, 103 denotes a first amplifier circuit, 303 denotes a high-pass filter (HPF), 104 denotes a low-pass filter, 105 denotes a second amplifier circuit, 304 denotes an AD converter, 305 denotes an equalizer block in a digital signal processing circuit configuration, 306 denotes a decoder, 106 denotes an output terminal, 107 denotes a 90-degrees phase-shifting circuit, 108 denotes a local oscillator circuit, 109 denotes a filter control circuit, and 110 denotes a band selection signal. Note that, for an orthogonal signal, another mixer, another first amplifier circuit, another low-pass filter, another second amplifier circuit, and another output terminal which are for processing another signal different in phase by 90 degrees are configured in a paired manner.

The receiving circuit for high frequency signal of the embodiment applies a control signal 308 to the equalizer block 305 and selects an equalizer in the equalizer block 305 to compensate for a frequency characteristic of a signal outputted from the AD converter 304 during HSDPA reception. An equalizer in the equalizer block 305 is not selected according to the control signal 308 during normal telephone call.

Therefore, according to the configuration of the embodiment, since an equalizer in the equalizer block 305 is turned OFF and not used during normal telephone call, power consumption can be reduced. On the other hand, during HSDPA reception, since an equalizer in the equalizer block 305 is used to compensate for a frequency characteristic, an excellent signal reception characteristic can be obtained. And, since the cutoff frequency in the CR filter of the HPF 303 can be set to be 10 kHz or more, which is effective for reduction of an IC chip area and size reduction of the signal reception apparatus.

Seventh Embodiment

Figure 14:
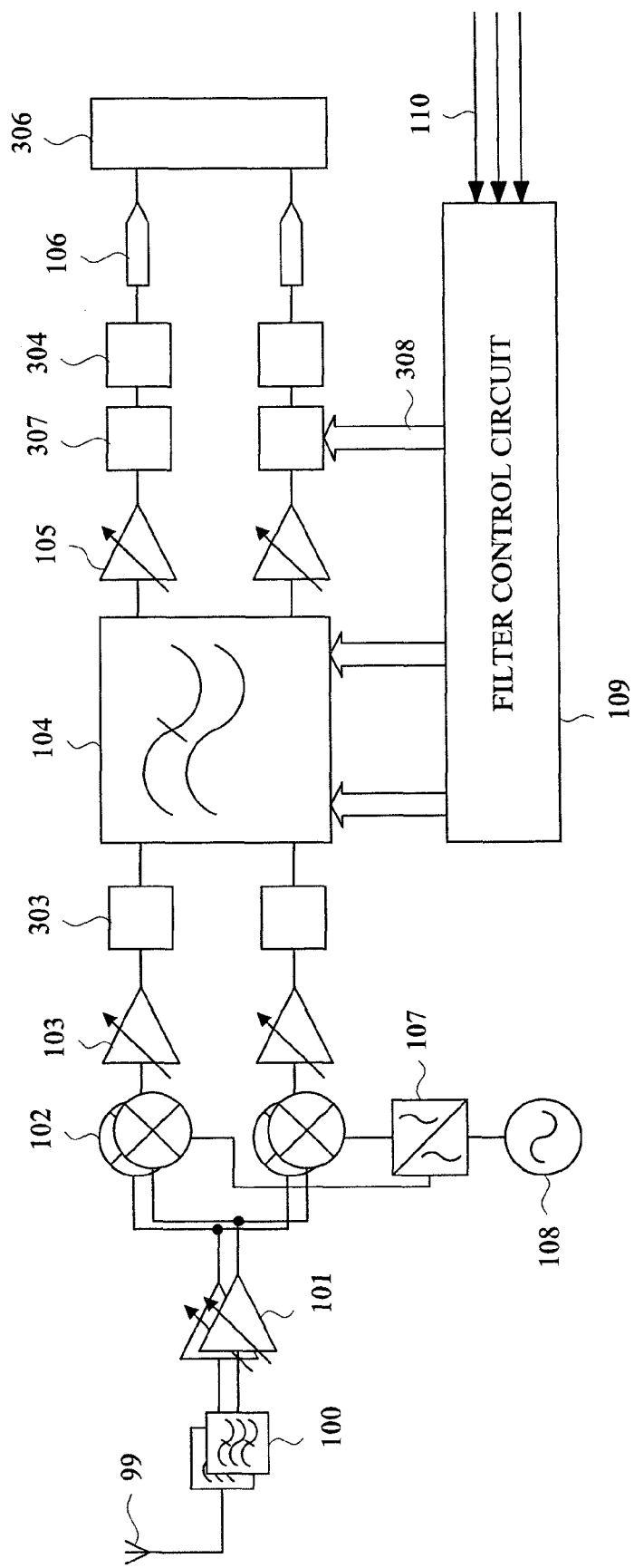
FIG. 14 is a diagram showing a configuration of a receiving circuit in a seventh embodiment of the present invention.

Referring to FIG. 14, one example of configuration and operation of a receiving circuit in a seventh embodiment of the present invention will be explained. FIG. 14 shows the configuration of the receiving circuit.

In FIG. 14, the same blocks as those in FIG. 13 are attached with the same reference symbols, and explanation thereof is omitted. In FIG. 14, an equalizer block 307 with an analog signal processing configuration is used as the equalizer block.

The receiving circuit for a high frequency signal of the embodiment applies a control signal 308 to the equalizer block 307 and selects an equalizer in the equalizer block 307 to compensate for a frequency characteristic of a signal outputted from the AD converter 304 during HSDPA reception. The equalizer in the equalizer block 307 is not selected by a control signal 308 during ordinary telephone call.

Therefore, according to the configuration of the embodiment, since an equalizer in the equalizer block 307 is turned OFF and not used during normal telephone call, power consumption can be reduced. On the other hand, during HSDPA reception, since an equalizer in the equalizer block 307 is used to compensate for a frequency characteristic, an excellent signal reception characteristic can be obtained. And, since the cutoff frequency in the CR filter of the HPF 303 can be set to be 10 kHz or more, which is effective for reduction of an IC chip area and size reduction of the signal reception apparatus.

Eighth Embodiment

Figure 15:
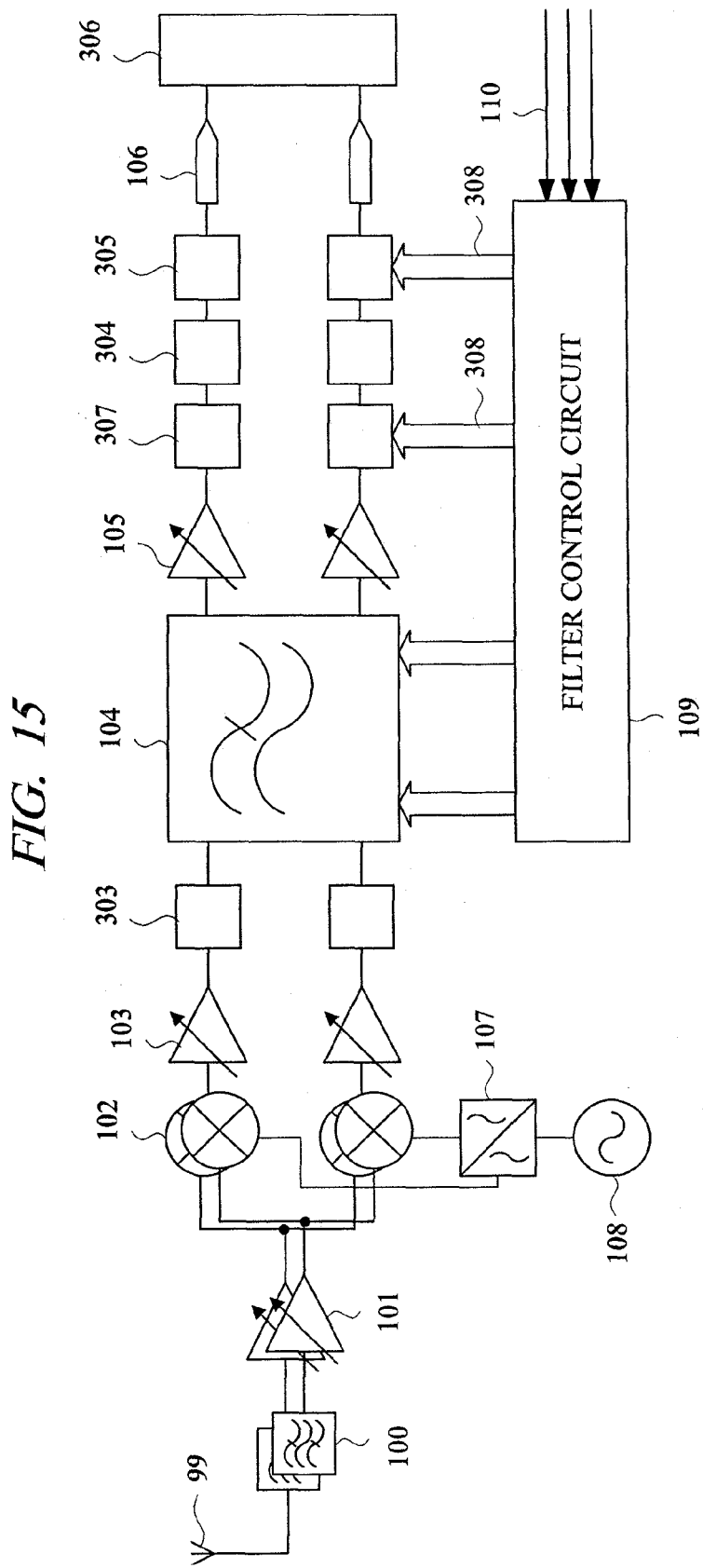
FIG. 15 is a diagram showing a configuration of a receiving circuit in an eighth embodiment of the present invention.

Referring to FIG. 15, one example of configuration and operation of a receiving circuit in a eighth embodiment of the present invention will be explained. FIG. 15 shows the configuration of the receiving circuit.

In FIG. 15, the same blocks as those in FIG. 13 are attached with the same reference symbols, and explanation thereof is omitted. In FIG. 15, an equalizer block 305 with a digital signal processing configuration and an equalizer block 307 with an analog signal processing configuration are used as the equalizer blocks.

The receiving circuit for a high frequency signal of the embodiment applies a control signal 308 to the equalizer blocks 305 and 307 and selects equalizers in the equalizer blocks 305 and 307 to compensate for a frequency characteristic of a signal outputted from the AD converter 304 during HSDPA signal reception. The equalizers in the equalizer blocks 305 and 307 are not selected by the control signal 308 during normal telephone call.

Therefore, according to the configuration of the embodiment, since the equalizers in the equalizer blocks 305 and 307 are turned OFF and not used during normal telephone call, power consumption can be reduced. On the other hand, during HSDPA reception, since the equalizers in the equalizer blocks 305 and 307 are used to compensate for the frequency characteristic, an excellent signal reception characteristic can be obtained. And, since the cutoff frequency in the CR filter of the HPF 303 can be set to be 10 kHz or more, which is effective for reduction of an IC chip area and size reduction of the signal reception apparatus.

The invention which has been made by the present inventors has been specifically explained based upon the embodiments of the present invention, but the present invention is not limited to the embodiments and it may be modified variously without departing from the scope of the invention.

INDUSTRIAL APPLICABILITY

The present invention relates to a cellular phone and is particularly effective in application to a receiving circuit that can receive a plurality of band wireless signals. And, in the case where spurious removal near a transmission bandwidth is required in a communication circuit that can perform transmission and reception of a plurality of wireless frequency bandwidths, the present invention can be applied in order to suppress unnecessary waves by inserting the filter of the present invention into a transmission circuit.

What we claim is:

1. A receiving circuit for performing reception of a plurality of band signals and suppression of blockers that remain in the plurality of band signals being received and converted in frequency, said receiving circuit comprising:
    a first low-pass filter that has a first pole position and that is configured to suppress blockers remaining in a received signal by the first pole position;
    a second low-pass filter that has a second pole position different from the first pole position and that is configured to suppress blockers remaining in a signal that has passed through said first low-pass filter by the second pole position; and
    a switch that is configured to switch on/off an input-output path including said first and second low-pass filters so that the received signal passes through said first low-pass filter without passing through said second low-pass filter in case of receiving a first band signal while the received signal passes through both said first and second low-pass filters in case of receiving a second band signal different from the first band signal.

2. The receiving circuit according to claim 1,
    wherein said first low-pass filter has a characteristic having no notch while said second low-pass filter has a characteristic having a notch, and
    wherein said first and second low-pass filters are set so that a frequency of a blocker remaining in a signal that has passed through said first low-pass filter is within a bandwidth of the notch of said second low-pass filter.

3. The receiving circuit according to claim 1, further comprising:
    a blocker detector to detect a blocker remaining in a signal that has passed through said first low-pass filter,
    wherein the input-output path including said first and second low-pass filters is switched on/off by said switch so that the received signal passes through both said first and second low-pass filters in case that the blocker has been detected by said blocker detector.

4. The receiving circuit according to claim 1,
    wherein the plurality of band signals includes at least two band signals of bands I to VI of UMTS, and
    wherein the first band signal belongs to either of the bands I and VI, and the second band signal belongs to either of the bands II to V.

5. The receiving circuit according to claim 4,
    wherein said first low-pass filter has a characteristic having no notch while said second low-pass filter has a characteristic having a notch, and
    wherein said first and second low-pass filters are set so that a frequency of a blocker remaining in a signal that has passed through said first low-pass filter is within a bandwidth of the notch of said second low-pass filter.

6. The receiving circuit according to claim 4, further comprising:
    a blocker detector to detect a blocker remaining in a signal that has passed through said first low-pass filter,
    wherein the input-output path including said first and second low-pass filters is switched on/off by said switch so that the received signal passes through both said first and second low-pass filters in case that the blocker has been detected by said blocker detector.

7. The receiving circuit according to claim 1,
    wherein said first low-pass filter includes an emitter follower, and said second low-pass filter includes an operational amplifier comprised of a MOSFET.

8. The receiving circuit according to claim 1,
    wherein said switch is configured to perform on/off-switching in accordance with a band selection signal to select a band of a signal to receive from among a plurality of bands of the plurality of band signals.

9. The receiving circuit according to claim 1,
    wherein said first and second low-pass filters are set in cutoff frequency for each band of signals to receive.

10. The receiving circuit according to claim 1, further comprising:
    an equalizer that is capable of adjusting amplitude and phase of a signal,
    wherein said equalizer is configured to turn on in case of receiving the first band signal while said equalizer is configured to turn off in case of receiving the second band signal.

* * * * *